United States Patent
Bailey et al.

(10) Patent No.: US 10,544,822 B2
(45) Date of Patent: Jan. 28, 2020

(54) DOUBLE-LOCK CARABINER

(71) Applicant: TruBlue LLC, Boulder, CO (US)

(72) Inventors: Carl Andrew Bailey, Boulder, CO (US); Ryan Daniel Walker, Broomfield, CO (US)

(73) Assignee: TRUBLUE LLC, Boulder, CO (US)

( * ) Notice: Subject to any disclaimer, the term of this patent is extended or adjusted under 35 U.S.C. 154(b) by 45 days.

(21) Appl. No.: 15/886,410

(22) Filed: Feb. 1, 2018

(65) Prior Publication Data

US 2018/0216656 A1  Aug. 2, 2018

Related U.S. Application Data

(60) Provisional application No. 62/453,195, filed on Feb. 1, 2017.

(51) Int. Cl.
| | |
|---|---|
| *F16B 45/02* | (2006.01) |
| *F16B 45/06* | (2006.01) |
| *B60C 27/08* | (2006.01) |
| *B60C 27/10* | (2006.01) |
| *F16B 45/04* | (2006.01) |

(52) U.S. Cl.
CPC .............. *F16B 45/02* (2013.01); *B60C 27/08* (2013.01); *B60C 27/10* (2013.01); *F16B 45/04* (2013.01)

(58) Field of Classification Search
CPC ......... Y10T 24/45366; Y10T 24/45414; F16B 45/02; F16B 45/04; B60C 27/08; B60C 27/10; A63G 21/00
See application file for complete search history.

(56) References Cited

U.S. PATENT DOCUMENTS

| | | | |
|---|---|---|---|
| 245,893 A | | 8/1881 | Tunnington |
| 370,983 A | * | 10/1887 | Stahl ................ F16B 45/02 24/601.1 |
| 479,524 A | | 7/1892 | Nicholson |
| 546,084 A | | 9/1895 | Webb |
| 547,528 A | | 10/1895 | Weaver et al. |
| 654,687 A | | 7/1900 | Suter |
| 926,156 A | | 6/1909 | Waterhouse et al. |
| 1,087,062 A | | 2/1914 | Izett |

(Continued)

FOREIGN PATENT DOCUMENTS

| | | |
|---|---|---|
| DE | 4237263 | 7/1994 |
| EP | 0131384 | 1/1985 |
| EP | 1386814 | 2/2004 |
| GB | 920392 | 3/1963 |
| GB | 1527238 | 10/1978 |
| WO | WO 2009143529 A2 | 11/2009 |

OTHER PUBLICATIONS

PCT International Search Report and Written Opinion in International Application PCT/US2018/016475, dated Apr. 16, 2018, 16 pages.

(Continued)

*Primary Examiner* — Robert Sandy

(57) ABSTRACT

A locking carabiner includes a body having a first end and a second end. A gate rotatably coupled to the second end about a gate axis, and a locking mechanism rotatably coupled to the gate about a locking mechanism axis. The locking member is configured to engage with the first end, and the gate axis is substantially parallel to, and offset from, the locking mechanism axis. Additionally, the rotation of the locking mechanism is in a substantially similar plane as the rotation of the gate.

18 Claims, 10 Drawing Sheets

(56) References Cited

U.S. PATENT DOCUMENTS

| | | | |
|---|---|---|---|
| 1,087,063 A | 2/1914 | Izett | |
| 1,228,694 A | 6/1917 | Netcott | |
| 1,371,619 A | 3/1921 | Greenstreet | |
| 1,490,619 A | 4/1924 | Manikowske et al. | |
| 1,576,352 A * | 3/1926 | Nordling | F16B 45/02 |
| | | | 24/599.8 |
| 1,873,196 A | 8/1932 | Harris et al. | |
| 1,935,711 A | 11/1933 | Hecox | |
| 1,958,877 A | 5/1934 | Yake | |
| 2,229,935 A | 1/1941 | Powers | |
| 2,812,010 A | 11/1957 | Abdallah | |
| 3,040,678 A | 6/1962 | McEwen | |
| 3,070,035 A | 12/1962 | Russo et al. | |
| 3,192,872 A | 7/1965 | Parent | |
| 3,398,714 A | 8/1968 | Wallin et al. | |
| 3,480,272 A | 11/1969 | Ziebart | |
| 3,759,190 A | 9/1973 | Harvey | |
| 4,062,293 A | 12/1977 | Davis | |
| 4,159,113 A | 6/1979 | Callecod | |
| 4,440,432 A * | 4/1984 | Goris | B66C 1/36 |
| | | | 24/599.8 |
| 4,621,851 A | 11/1986 | Bailey, Jr. | |
| 4,721,268 A | 1/1988 | Lerner et al. | |
| 4,892,508 A | 1/1990 | Ryan | |
| 4,948,118 A | 8/1990 | Miraglia | |
| 5,094,171 A | 3/1992 | Fujita | |
| 5,113,768 A | 5/1992 | Brown | |
| 5,224,425 A | 7/1993 | Remington | |
| 5,261,343 A | 11/1993 | Elterman et al. | |
| 5,316,246 A | 5/1994 | Scott | |
| D372,188 S | 7/1996 | Van Dyke | |
| D382,190 S | 8/1997 | Blackston et al. | |
| 5,701,824 A | 12/1997 | Johnson et al. | |
| 5,904,099 A | 5/1999 | Danneker | |
| 5,931,100 A | 8/1999 | Sutton et al. | |
| 5,954,301 A | 9/1999 | Joseph | |
| 6,164,582 A | 12/2000 | Vara | |
| 6,206,330 B1 | 3/2001 | Oi | |
| D449,580 S | 10/2001 | Gee, II | |
| 6,363,858 B1 | 4/2002 | Voirin | |
| 6,640,727 B2 | 11/2003 | Ostrobrod | |
| D484,035 S | 12/2003 | Smith-Keilland et al. | |
| 6,666,773 B1 | 12/2003 | Richardson | |
| D488,054 S | 4/2004 | Myers | |
| 6,810,818 B2 | 11/2004 | Petzl et al. | |
| D549,557 S | 8/2007 | Mori et al. | |
| D568,254 S | 5/2008 | Patchett | |
| D569,234 S | 5/2008 | Young, IV | |
| D569,236 S | 5/2008 | Young, IV | |
| D569,712 S | 5/2008 | Young, IV | |
| 7,381,137 B2 | 6/2008 | Steele et al. | |
| D572,573 S | 7/2008 | Abels | |
| D575,143 S | 8/2008 | Kuo et al. | |
| D589,899 S | 4/2009 | Huang | |
| D595,120 S | 6/2009 | Plowman | |
| D596,128 S | 7/2009 | Hung | |
| 7,610,706 B2 | 11/2009 | Pitcher et al. | |
| 7,624,684 B2 | 12/2009 | Morris | |
| D613,697 S | 4/2010 | Symons | |
| D617,741 S | 6/2010 | Fennell | |
| 7,819,066 B2 | 10/2010 | Smith | |
| 7,825,337 B2 | 11/2010 | Young, IV | |
| D640,527 S | 6/2011 | Hoek | |
| D644,501 S | 9/2011 | Chen | |
| 8,016,073 B2 | 9/2011 | Petzl et al. | |
| D648,685 S | 11/2011 | Symons | |
| D657,869 S | 4/2012 | Mammen | |
| D658,094 S | 4/2012 | Dunn | |
| D668,620 S | 10/2012 | Convert | |
| D670,995 S | 11/2012 | Stieler | |
| 8,336,463 B2 | 12/2012 | Smith | |
| D680,851 S | 4/2013 | Lo | |
| 8,424,460 B2 | 4/2013 | Lerner et al. | |
| 8,601,951 B2 | 12/2013 | Lerner | |
| 8,695,913 B2 | 4/2014 | Cheng | |
| D719,798 S | 12/2014 | Thompson | |
| 8,985,027 B2 | 3/2015 | Brown | |
| 8,998,151 B2 | 4/2015 | Hoek | |
| 9,016,649 B2 | 4/2015 | Nolle | |
| 9,033,115 B2 | 5/2015 | Lerner | |
| D735,018 S | 7/2015 | McEvilly | |
| D742,212 S | 11/2015 | Hsu | |
| 9,242,659 B2 | 1/2016 | Bernier | |
| 9,381,926 B2 | 7/2016 | Brannan | |
| D767,500 S | 9/2016 | Byrne | |
| D768,089 S | 10/2016 | Liu | |
| D773,414 S | 12/2016 | Hoffman | |
| D774,002 S | 12/2016 | Hsieh | |
| D774,383 S | 12/2016 | Kennedy | |
| D790,127 S | 6/2017 | Verleur | |
| D794,725 S | 8/2017 | Lamothe | |
| D799,941 S | 10/2017 | Rotherberg | |
| D802,168 S | 11/2017 | Lee | |
| D802,866 S | 11/2017 | Williams | |
| D805,879 S | 12/2017 | Garcia | |
| D807,735 S | 1/2018 | Nimgulkar et al. | |
| D811,857 S | 3/2018 | Williams | |
| 9,988,252 B1 | 6/2018 | Kunstadt | |
| D822,122 S | 7/2018 | Bilezikian | |
| D822,461 S | 7/2018 | Han | |
| D822,462 S | 7/2018 | Han | |
| D822,463 S | 7/2018 | Han | |
| D823,710 S | 7/2018 | Schone et al. | |
| 10,023,207 B2 | 7/2018 | Brown | |
| 10,023,208 B2 | 7/2018 | Brown | |
| 10,065,507 B1 | 9/2018 | Lerner | |
| D833,854 S | 11/2018 | Yamamoto | |
| D834,402 S | 11/2018 | Bailey | |
| D835,497 S | 12/2018 | Rindy et al. | |
| D835,974 S | 12/2018 | Moore et al. | |
| D835,975 S | 12/2018 | Putnam, Jr. | |
| D841,440 S | 2/2019 | Bailey | |
| D843,813 S | 3/2019 | Tillitski | |
| D862,205 S | 10/2019 | Bailey | |
| D865,492 S | 11/2019 | Bailey | |
| 2002/0050032 A1 | 5/2002 | Carnall | |
| 2002/0162477 A1 | 11/2002 | Palumbo | |
| 2004/0118982 A1 | 6/2004 | Shillings | |
| 2005/0189453 A1 | 9/2005 | DeGuevara | |
| 2006/0087139 A1 | 4/2006 | Ayres | |
| 2007/0235597 A1 | 10/2007 | Winchester | |
| 2008/0178760 A1 | 7/2008 | Frangos et al. | |
| 2008/0202375 A1 | 8/2008 | Quattlebaum | |
| 2009/0223406 A1 | 9/2009 | Smith | |
| 2010/0224714 A1 | 9/2010 | Winther et al. | |
| 2011/0083577 A1 | 4/2011 | Tilley | |
| 2011/0239898 A1 | 10/2011 | Brown | |
| 2012/0031296 A1 | 2/2012 | Smith | |
| 2013/0327242 A1 | 12/2013 | Bernier | |
| 2014/0311376 A1 | 10/2014 | Brannan | |
| 2014/0326161 A1 | 11/2014 | Halliday | |
| 2015/0266454 A1 | 9/2015 | McGowan | |
| 2015/0375758 A1 | 12/2015 | Strasser | |
| 2016/0050481 A1 | 2/2016 | Moats | |
| 2018/0304907 A1 | 10/2018 | Richardson | |
| 2018/0326957 A1 | 11/2018 | McGowan | |
| 2019/0134437 A1 | 5/2019 | Weston et al. | |
| 2019/0144244 A1 | 5/2019 | McGowan | |

OTHER PUBLICATIONS

Petzl Adventure Parks Catalog Z014AA04, 2017, in Spanish, 16 pages (and the English translation for the Petzl Adventure Parks Catalog Z014AC05, (dated 2019), 11 pages, (27 pages all together).

* cited by examiner

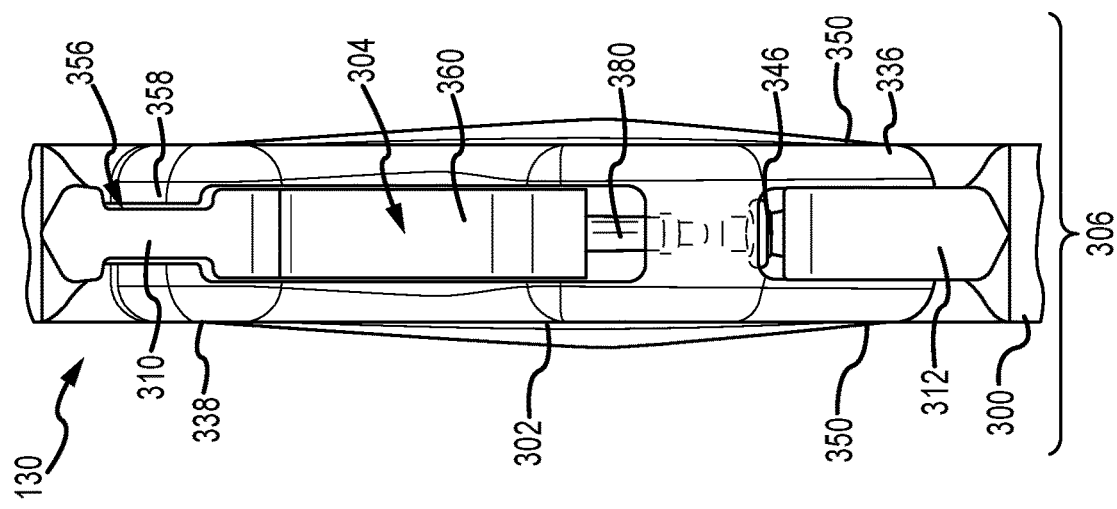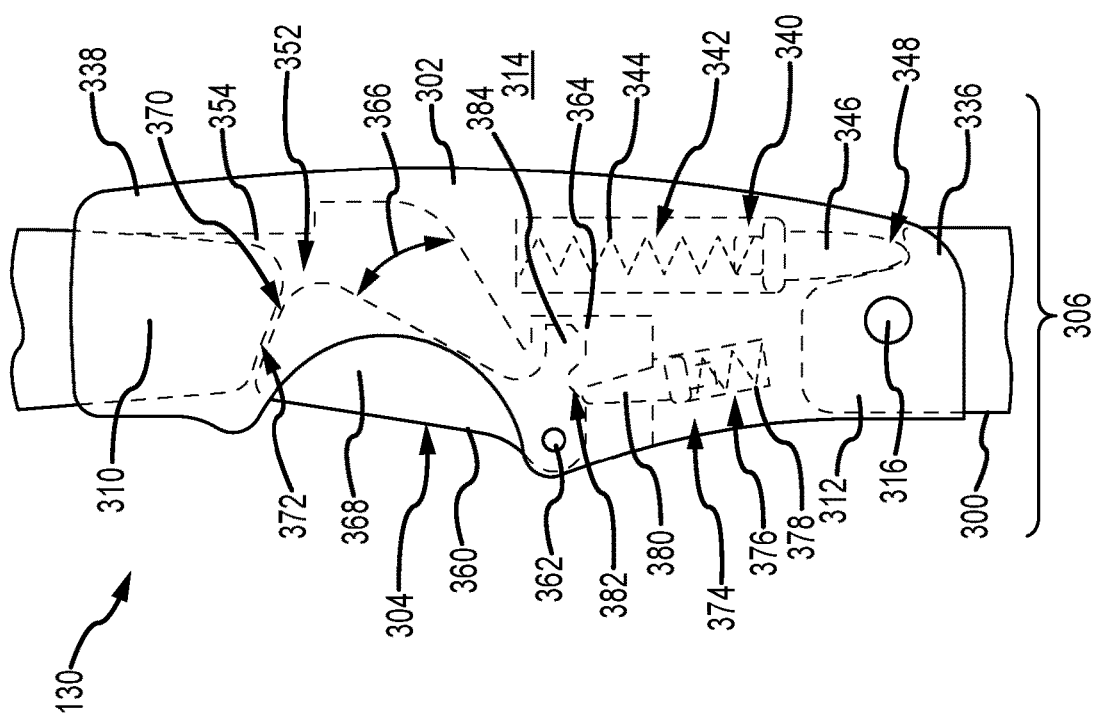

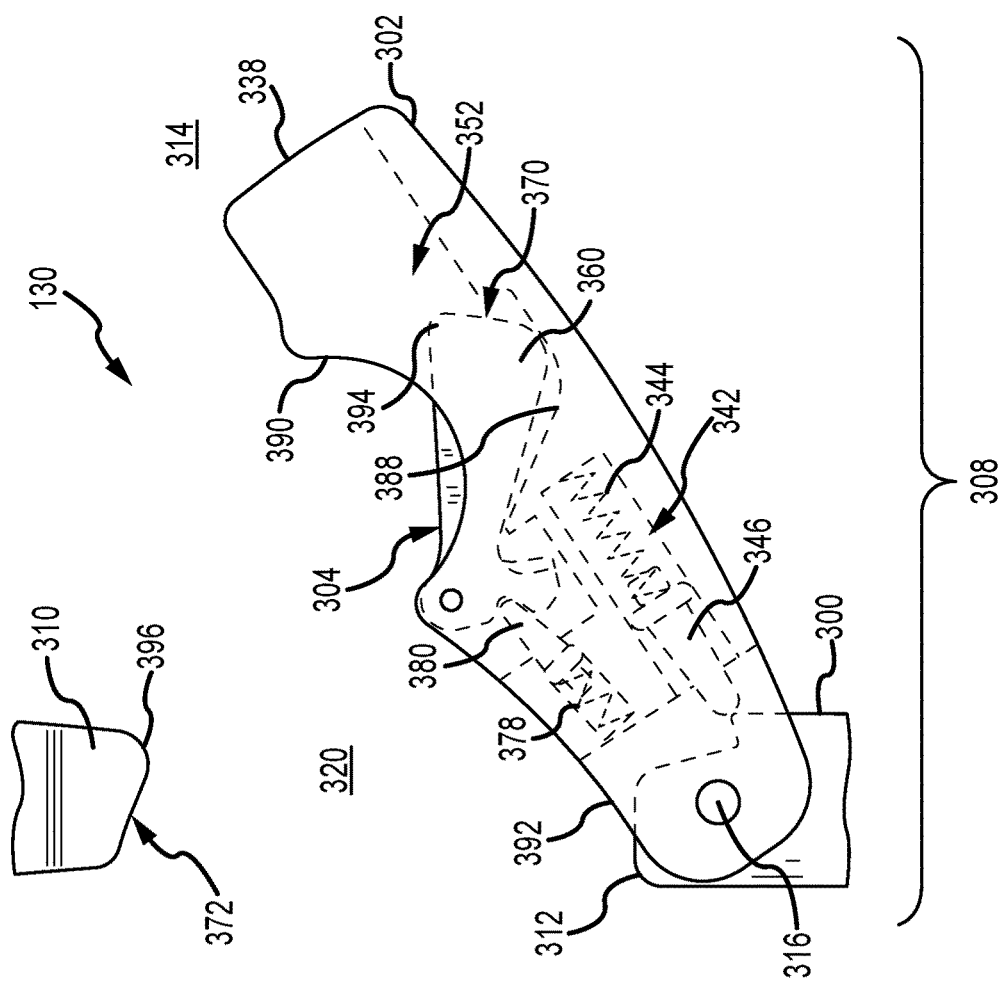
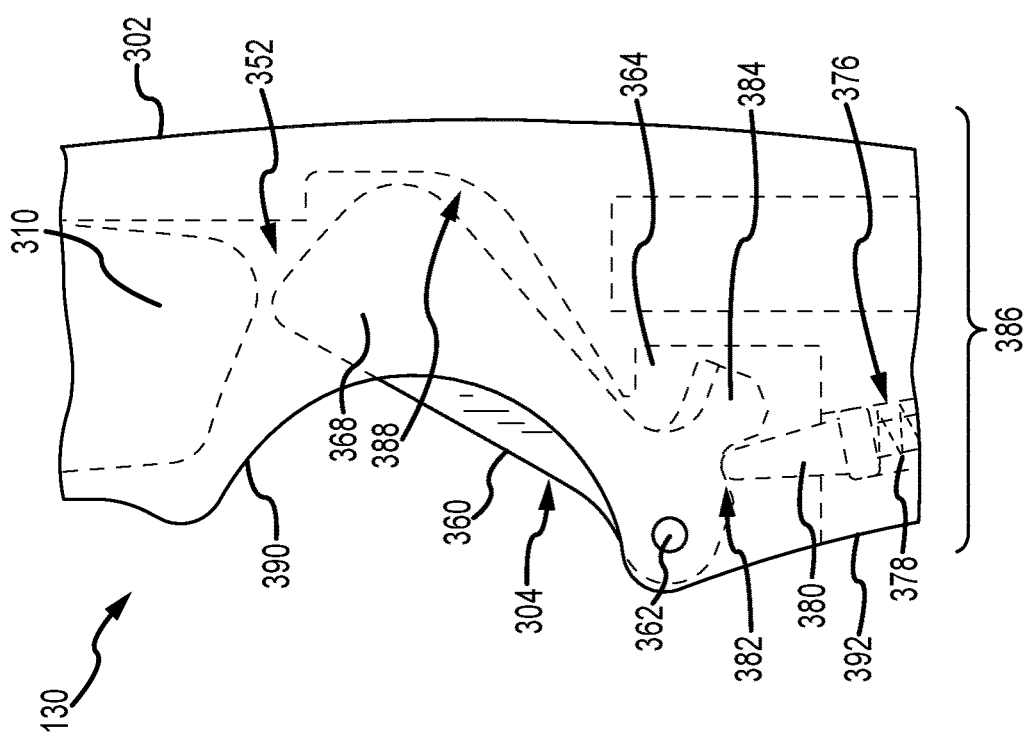
FIG.4D
FIG.4C

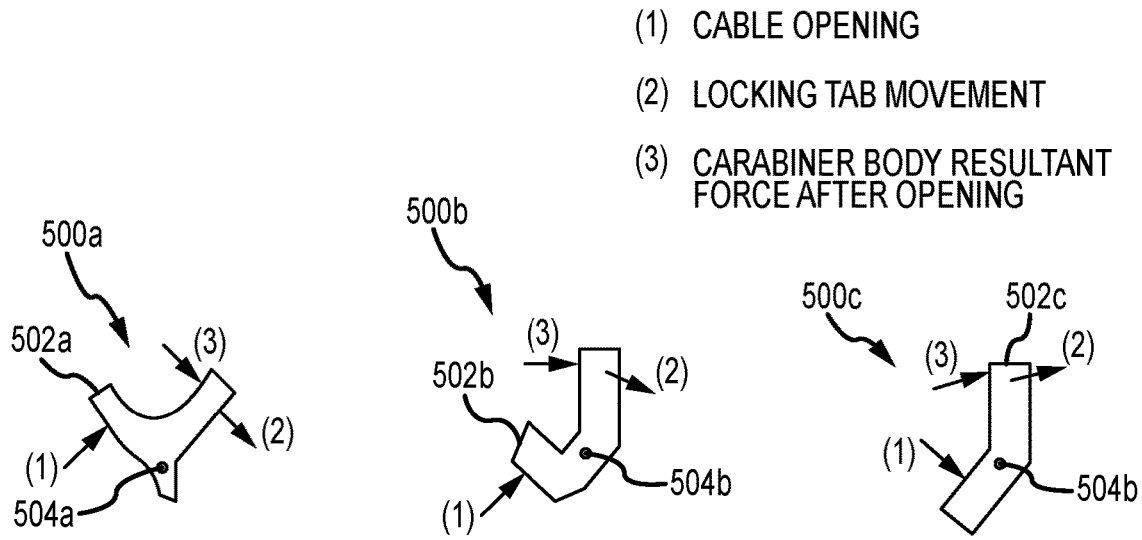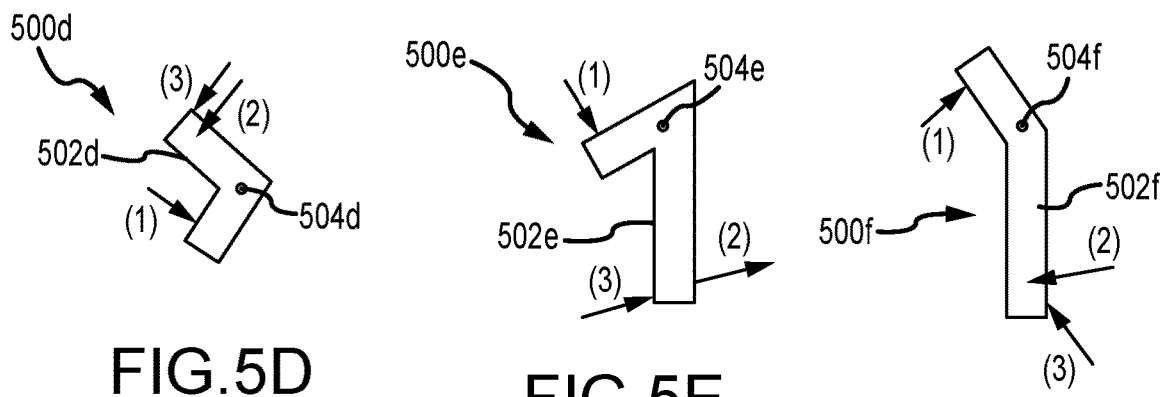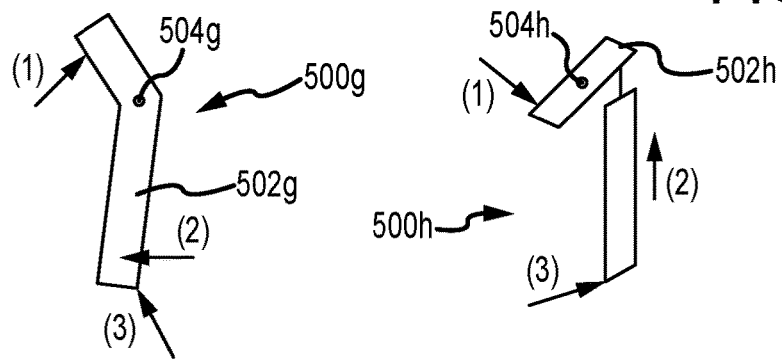

DOUBLE-LOCK CARABINER

CROSS-REFERENCE TO RELATED APPLICATIONS

This application claims the benefit of priority to U.S. Provisional Patent Application No. 62/453,195, titled "DOUBLE-LOCK CARABINER," and filed Feb. 1, 2017, which is hereby incorporated by reference in its entirety.

INTRODUCTION

Zip lines, alternatively written as "ziplines" or "zip-lines," refer to a form of entertainment in which a rider traverses a wire or other cable from one point to another. Typically, the traverse is powered by gravity, with the rider traveling from the high end of the zip line to the low end. Zip lines have become popular vacation activities and are becoming increasing common attractions at amusement parks, theme parks, and vacation spots.

Growth in commercial, recreational zip lines have been significant in recent years, a trend that appears will continue for the foreseeable future. The growth of the industry has coincided with higher rider speeds, longer descents—and much greater danger and risk to participants. With demand for greater speed also comes a need for safely retaining and supporting participants. In essence, demand has significantly outpaced the technology to ensure safety to riders.

Rolling trolleys are widely utilized for conveying loads from one location to another via rope, cable, track, or structural member (for example, I-beam, tube steel, steel bar, etc.). Zip line systems utilize similar trolleys to facilitate rider movement. For example, virtually all zip line rider trolleys employ multiple sheaves that engage a zip line (cable/wire), whereby a rider is suspended below—most typically via a suspension system composed of webbing and connectors, such as carabiners. A carabiner is generally a steel or aluminum loop body with a spring loaded gate to quickly and reversibly connect two or more components in the zip line system, for example, a trolley and a webbing assembly that is coupled to the participant.

In addition to zip lines, carabiners are widely utilized in other safety-critical systems in cable and rope intensive activities, e.g., rock and mountain climbing, arboriculture, caving, sailing, hot air ballooning, rope rescue, construction, industrial rope work, window cleaning, whitewater rescue, acrobatics, etc. At least some known carabiners include locking gates to secure the carabiner against unintentional opening during use. These known locking carabiners may include a screw lock, wherein a threaded sleeve is positioned over the gate to engage with a nose end of the body, or may include a twist/push-lock, wherein a locking mechanism is manually rotated and pulled to disengage the gate from the body. However, these known locking carabiners are designed mainly for rock and mountain climbing, and thus, may be more difficult to utilize in other activities, for example, in zip lines.

Double-Lock Carabiner

This disclosure describes examples of a locking carabiner and rider trolley adapted for use with zip line systems. The carabiner may also be used for any other cable and rope intensive activity as required or desired. In an example, the locking carabiner includes a double action locking gate. The gate includes a locking mechanism sized and shaped to be actuated before the gate can be opened. For example, the locking mechanism is configured to be actuated by an object that is to be received by the carabiner like a zip line wire. The locking mechanism extends along the longitudinal axis of the gate and is rotatable in a substantially similar direction and plane of the gate opening rotation. When the locking mechanism is locked, it is in a blocking position with respect to a nose of the carabiner such that the gate is restricted from undesirably and unintentionally opening without first actuating the locking mechanism, thereby increasing safety of the system. Rotation of the locking mechanism removes it from the blocking position with respect to the nose and unlocks the carabiner such that the gate may be opened.

In one aspect, the technology relates to a locking carabiner including: a body including a first end and a second end; a gate rotatably coupled to the second end about a gate axis; and a locking mechanism rotatably coupled to the gate about a locking mechanism axis, wherein the locking member is configured to engage with the first end, wherein the gate axis is substantially parallel to, and offset from, the locking mechanism axis, and wherein the rotation of the locking mechanism is in a substantially similar plane as the rotation of the gate.

In another aspect, the technology relates to a locking carabiner including: a substantially C-shaped body including a first end and a second end; a gate rotatably coupled to the second end, wherein the gate is rotatable between a closed position where the gate contacts the first end and an open position where the gate is positioned away from the first end, and wherein the gate is biased to rotate automatically towards the closed position; a locking mechanism rotatably coupled to the gate, wherein the locking mechanism is rotatable between a locked position where the locking mechanism is in a blocking position with respect to the first end to prevent the gate from opening and an unlocked position where the locking mechanism is out of the blocking position with respect to the first end to enable the gate to open, wherein the locking mechanism is biased to rotate automatically towards the locked position, and wherein a direction the gate rotates between the open position and the closed position is substantially similar to a direction the locking mechanism rotates between the locked position and the unlocked position.

These and various other features as well as advantages which characterize the double-lock carabiner described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

FIG. 4A is a partial enlarged side view of the carabiner in the closed and locked condition.

FIG. 4B is a partial enlarged front view of the carabiner in the closed and locked condition.

FIG. 4C is a partial enlarged side view of the carabiner in a closed and unlocked condition.

FIG. 4D is a partial enlarged side view of the carabiner in the open and unlocked condition.

FIGS. 5A-H are a plurality of free body diagrams illustrating alternative examples of a locking mechanism configuration for use with the carabiner.

DETAILED DESCRIPTION

This disclosure describes examples of a locking carabiner and rider trolley adapted for use with zip line systems. The carabiner may also be used for any other cable and rope intensive activity as required or desired. In an example, the locking carabiner includes a double action locking gate. The gate includes a locking mechanism sized and shaped to be actuated before the gate can be opened. For example, the locking mechanism is configured to be actuated by an object that is to be received by the carabiner like a zip line wire. The locking mechanism extends along the longitudinal axis of the gate and is rotatable in a substantially similar direction and plane of the gate opening rotation. When the locking mechanism is locked, it is in a blocking position with respect to a nose of the carabiner such that the gate is restricted from undesirably and unintentionally opening without first actuating the locking mechanism, thereby increasing safety of the system. Rotation of the locking mechanism removes it from the blocking position with respect to the nose and unlocks the carabiner such that the gate may be opened.

The carabiner may also be configured for use with an impact braking trolley so as to increase performance and reduce undesirable wear induced by the braking operations. In an example, a top portion of the carabiner has a circular cross-section so that when it is installed on the trolley, the carabiner is freely rotatable about the anchor point. The trolley includes a bushing so as to enable a smooth and secure rotation of the carabiner and increase performance of the trolley.

Throughout this description, references to orientation (e.g., front(ward), rear(ward), top, bottom, back, right, left, upper, lower, etc.) of the trolley and carabiner relate to their position when installed on a zip line and are used for ease of description and illustration only. No restriction is intended by use of the terms regardless of how the trolley and/or carabiner are situated on their own.

Figure 1:
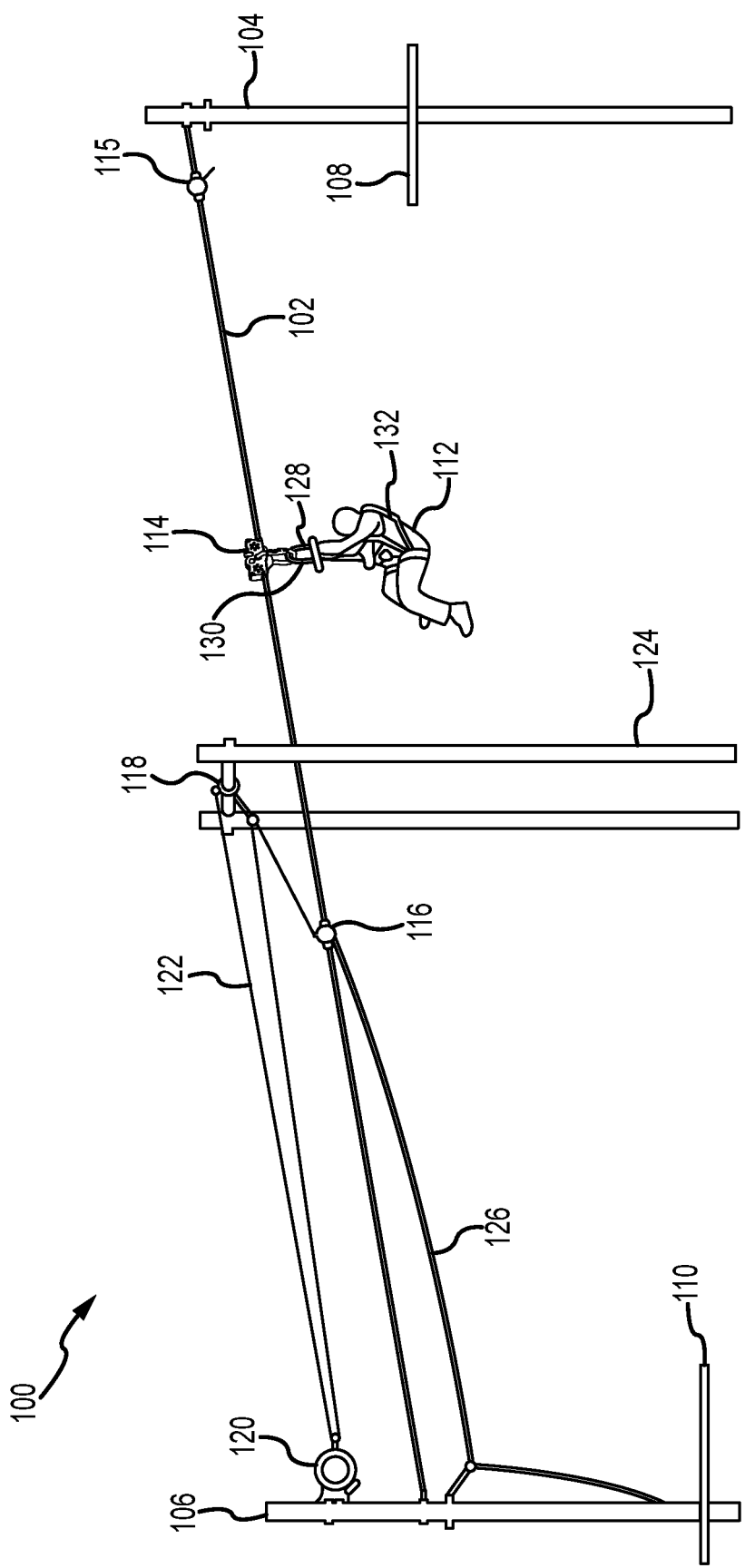
FIG. 1 is a schematic view of an exemplary zip line system.

FIG. 1 is a schematic view of an exemplary zip line system 100. The zip line system 100 includes a zip line 102 that may be any type of suitable cable or wire having a defined diameter but is most often steel. The zip line 102 extends between an upper anchor 104 and a lower anchor 106. Each of the upper anchor 104 and the lower anchor 106 may be a pole (as shown), or some other manmade structure (e.g., a tower, building, crane, etc.), or a natural feature such as a rock outcrop or a tree. The upper anchor 104 has a launch position for riders, illustrated as a launch or initiation platform 108 attached to the pole. Likewise, a terminal or landing platform 110 is also provided on the lower pole. A rider 112 is illustrated in decent hanging below a rider trolley 114. A launch mechanism 115 may be used to hold the rider trolley 114 until the time of launch.

After launch, the rider trolley 114 traverses under gravity down the zip line 102 until the trolley 114 impacts a brake 116. Impact with the brake 116 causes the trolley 114 to decelerate so that the rider 112 stops before reaching the end of the zip line 102 at the lower anchor 106. The brake 116 may be a brake trolley, a brake block (as shown), a spring, or other type of mechanism, typically attached to the zip line 102. In the system 100, the brake 116 may be attached via a redirectional pulley 118 to a braking device 120 via a brake cable 122 as shown. In some systems, the redirectional pulley 118 is anchored to a gantry 124 or other intermediate structure, although many systems use an accessory line (not shown), which is a second line strung above or next to the zip line 102 to anchor components such as the redirectional pulleys 118. In the system 100 shown, the braking device 120 is a zipSTOP™ eddy current braking device although any suitable braking mechanism may be used.

In the example, the brake 116 is provided with a retrieval line 126. In systems where the brake 116 attaches to the rider trolley 114 upon impact, the retrieval line 126 can be used to pull the rider trolley 114 to the landing platform 110 in the event that the rider 112 does not have enough momentum to reach the platform 110 under gravity alone. This may occur for any number of reasons such as light riders relative to the brake resistance, poorly functioning rider trolley, and/or excessive headwinds.

A secondary brake, sometimes also referred to as an emergency arrest device (EAD) may also be provided (not shown). The EAD may take the form of a second brake or some other device to prevent injury to the rider 112 due to impact with the lower anchor in case of a failure in the primary braking system shown.

For clarity, the phrases "zip line system" or "system" will be used when referring to all the components generally and zip line 102 will be used to refer to the actual cable/wire. Likewise, the phrase "trolley" and "rider trolley" will be used for the rider trolley 114 while the phrase "brake trolley" shall refer only to a trolley using a brake 116 adapted to cause braking to the rider trolley 114.

Additionally, in the system 100 shown, a payload, such as the rider 112, is suspended from the rider trolley 114 via a webbing assembly 128, such as a lanyard, through a pivoting link, such as a carabiner 130. The rider trolley 114 and the carabiner 130 are described in further detail below in reference to FIGS. 2A-4D. The carabiner 130 facilitates securing the rider 112 to the rider trolley 114 while also providing a pivoting point for the rider 112 with respect to the rider trolley 114. Typically in the zip line systems 100, the rider 112 is fitted with a harness 132 that is coupled to the webbing assembly 128 and attached to the webbing assembly 128, via the carabiner 130, is the rider trolley 114.

During operation, the rider 112 may approach the initiation platform 108 with the rider trolley 114 in hand for attachment to the zip line 102. In some known zip line systems the rider trolley needs to be detached from the webbing assembly in order for the rider trolley to be positioned on the zip line, as well as taken off the zip line, before recoupling the rider trolley to the webbing. This operation procedure facilitates the rider being on the platform (either upper or lower) and being temporarily detached from the rider trolley and, as such, provides an opportunity for the rider trolley to fall from the zip line system. In systems with a large number of zip line segments, this form of attachment system generates a large number of opportunities for the rider trolley to be undesirably dropped. However, in this example, the rider trolley 114 and carabiner 130 are configured so that they may be installed on the zip line 102 with the rider trolley 114 still attached to rider 112 via the webbing assembly 128 and the carabiner 130, thereby, decreasing rider dis-attachment time to the trolley and increasing safety for the rider. The rider trolley 114 and the carabiner 130 for use with this system 100 are discussed in greater detail below.

Figure 2A:
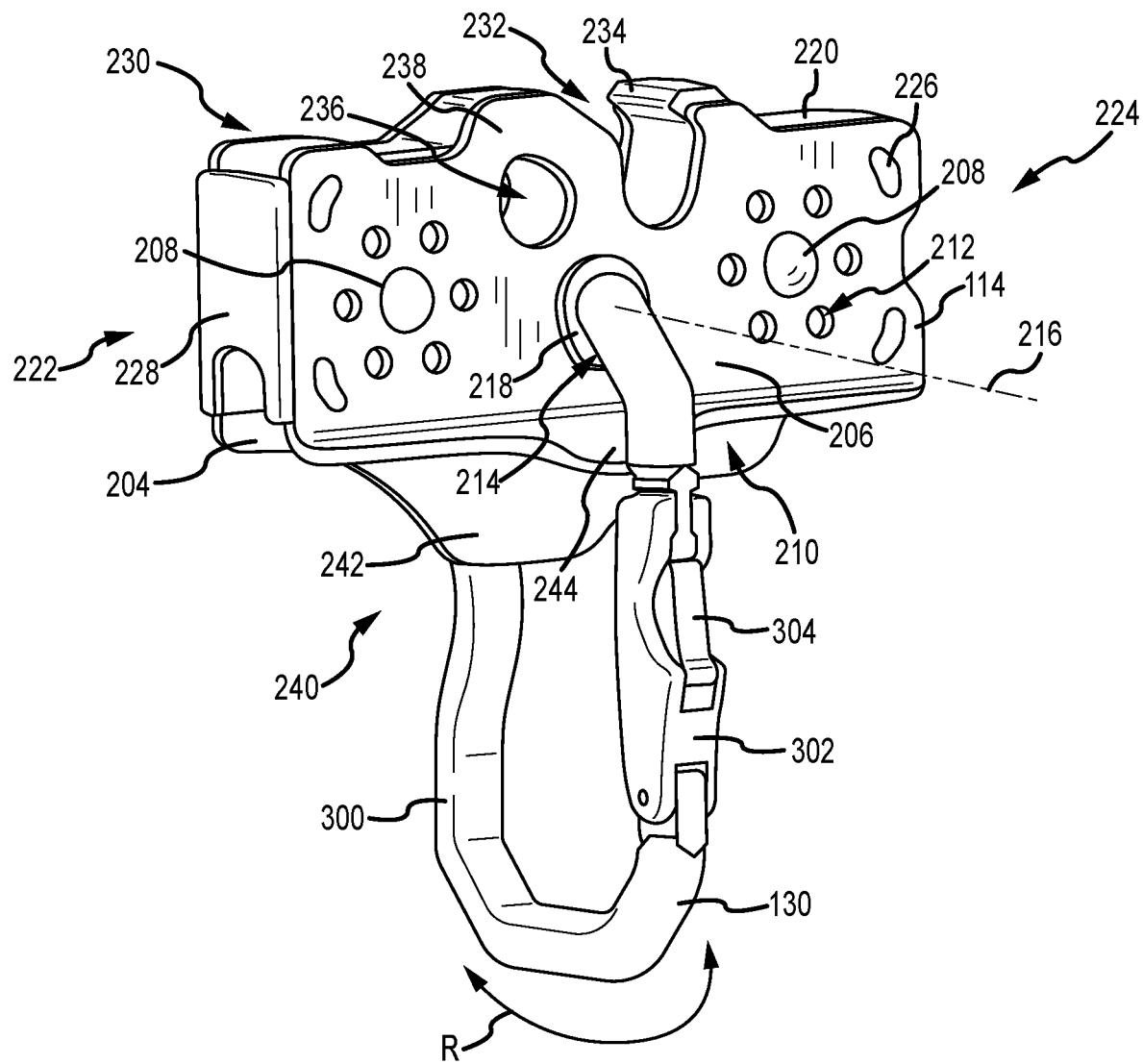
FIG. 2A is a perspective view of an exemplary rider trolley and carabiner for use with the zip line system shown in FIG. 1.
Figure 2B:
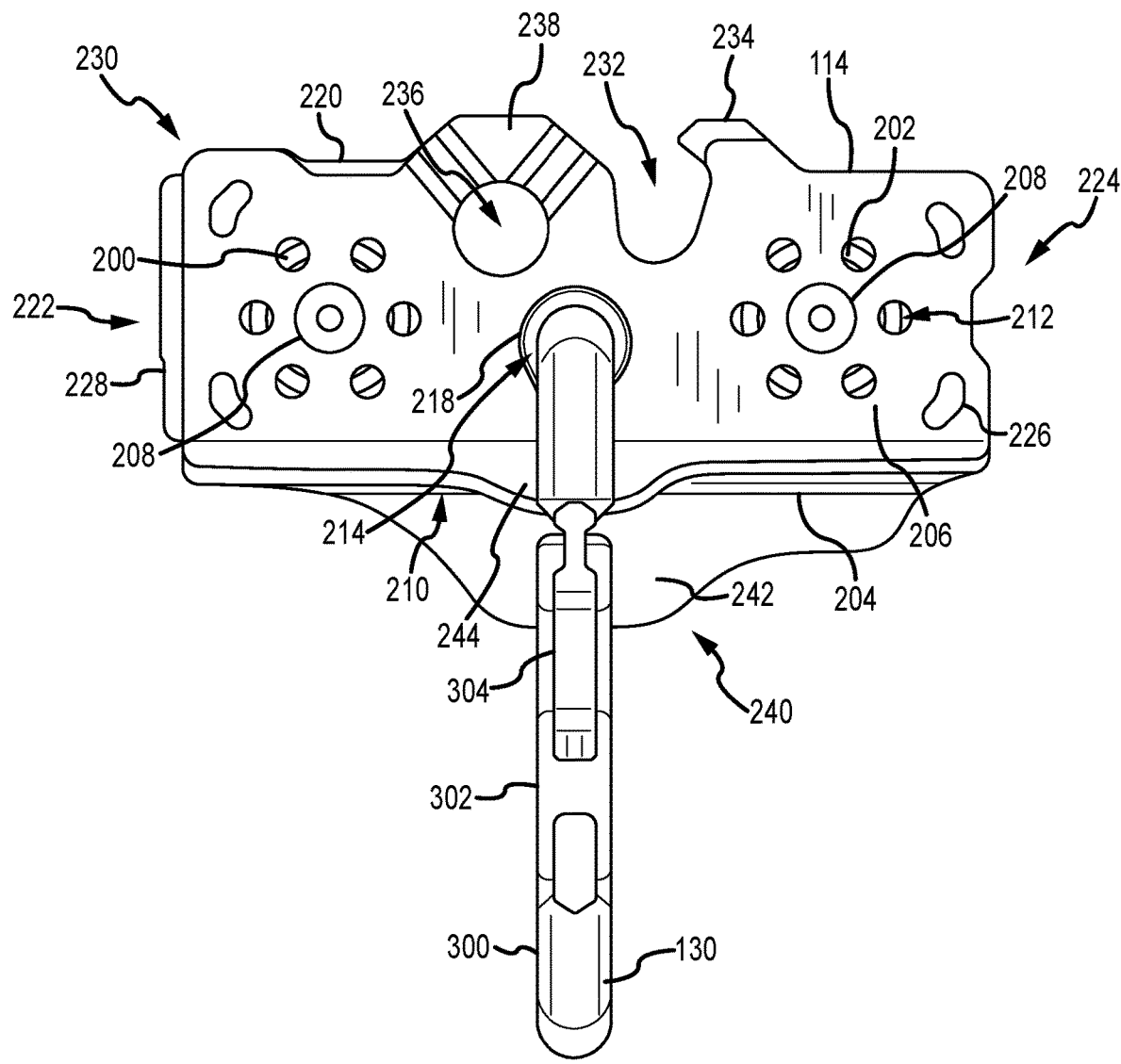
FIG. 2B is a side view of the rider trolley and carabiner.

FIG. 2A is a perspective view of the exemplary rider trolley 114 and carabiner 130 for use with the zip line system 100 (shown in FIG. 1). FIG. 2B is a side view of the rider trolley 114 and the carabiner 130. Referring concurrently to FIGS. 2A and 2B, the rider trolley 114 includes a front sheave 200 and a rear sheave 202 that are both rotatably mounted between two opposing side plates 204, 206 via one or more bearings (not shown) positioned around pivot pins 208. The side plates 204, 206 are wide enough apart to accommodate the zip line 102 (shown in FIG. 1) and allow the rider trolley 114 to be placed on (installed) and removed from the zip line via a bottom opening 210. Each side plate 204, 206 includes one or more vent openings 212 positioned proximate the sheaves 200, 202 so that the shaves may be air cooled. The vent openings 212 may be any shape, size, and/or configuration as required or desired.

An anchor point in the form of an aperture 214 is provided in each side plate 204, 206 for attaching a cable or webbing connected to a rider or other payload to the trolley 114. In the example, the aperture 214 is substantially circular and sized so as to receive a top portion of the carabiner 130. The aperture 214 defines a carabiner rotation axis 216 for the carabiner 130 to rotate about. A self-lubricating polymer bushing 218 may surround the aperture 214 so as to enable smooth and secure carabiner rotation R about the carabiner rotation axis 216. When an anchor coupling (e.g., the carabiner 130) is passed through the anchor point of both side plates 204, 206 within the bushing 218 and the rider trolley 114 is installed on a zip line, the carabiner 130 locks the trolley 114 to the zip line and prevents the trolley from being removed or from falling off of the zip line. In other examples, the trolley 114 may not include the bushing 218 and the carabiner 130 is only passed through the anchor point of both side plates 204, 206.

The carabiner 130 includes a body 300 having a gate 302 rotatably coupled thereto such that components may be secured within the carabiner. The gate 302 includes a locking mechanism 304 so as to prevent the gate 302 from unintentionally opening. The carabiner 130 is described further below in reference to FIGS. 3A-4D. In the example, the carabiner 130 is configured to rotatably couple to the trolley 114 through the aperture 214 so that it may freely rotate around the carabiner rotation axis 216. In the example, the body 300 is sized and shaped such that it may rotate a full 360° around the carabiner rotation axis 216 without contacting the rider trolley 114. Additionally, the gate 302 is sized and shaped such that when it is opened the zip line may be received within the carabiner 130 so as to secure the trolley 114 to the zip line. Also, the webbing assembly that is attached to the rider harness may be received within the carabiner 130 so as to secure the trolley 114 to the rider. As such, the carabiner 130 acts as a pivoting load arm of the trolley 114 in which the payload (e.g., rider) is attached through and is able to rotate about the carabiner rotation axis 216.

In the example, the anchor point is positioned above the zip line when the rider trolley 114 is mounted on the zip line. In one example, the anchor point is in line with the pivot pins 208 such that the carabiner rotation axis 216 is in the same vertical plane as the pivot pins 208. In another example, the carabiner rotation axis 216 may be offset (either towards the top or the bottom) from the vertical plane of the pivot pins 208. Additionally, the anchor point is substantially centered about a midpoint defined between the front sheave 200 and the rear sheave 202. Because the anchor point, when installed on a zip line, is equidistant from the two sheaves 200, 202, and a sufficiently heavy payload is attached through the anchor point, the sheaves 200, 202 are substantially equally loaded against the zip line so that both sheaves easily roll along the zip line.

Opposite the bottom opening 210 that enables the rider trolley 114 to be mounted on top of the zip line, an insert 220 is disposed between the two side plates 204, 206. The insert extends from a front 222 of the rider trolley 114 to a rear 224 of the rider trolley 114 and corresponds to the top shape of the side plates 204, 206. One or more keys 226 (e.g., front and back, top and bottom) are included in the insert 220 so as to secure the insert to the side plates 204, 206. In the example, the insert 220 is a polymer material that at least partially encloses the sheaves 200, 202 within the side plates 204, 206 so as to reduce dirt and debris accumulation, to restrict access to the sheaves 200, 202, and to increase impact resistance and overall durability of the trolley 114. A front bumper 228 extends from the front of the insert 220 across the side plates 204, 206 and substantially perpendicular to the zip line when the trolley 114 is installed thereon. The bumper 228 forms an impact surface that provides a greater surface area for engagement with brake during trolley braking operation, which decreases the wear on both the brake and the trolley 114.

In the zip line system described in FIG. 1 above, the brake is an impact braking type system, wherein as the trolley 114 travels down the zip line, the front 222 of the trolley 114 impacts the brake head-on to slow down and stop the trolley 114. In some known trolleys, this braking force destabilizes the load supported by the trolley 114 and generates an overturning moment that induces rotation of the trolley 114, thereby lifting at least a portion of the trolley off of the zip line. In addition to creating additional uncontrollable and unintended drag, such rotation of the trolley can also cause wear or damage to the rider trolley, the brake, the zip line, and/or the carabiner/anchor coupling. In this example, however, by positioning the anchor point between the front and rear sheaves 200, 202 and above the zip line when installed, the braking forces are substantially in line with the center of the sheaves, thereby reducing the overturning moment on the trolley 114 and reducing the lift off of the zip line. Furthermore, by attaching the load via the rotatable carabiner 130, the load is enabled to swing about the carabiner rotation axis 216 further reducing the overturning moment due to the braking forces and the resulting lift off of the zip line for smooth braking. The design and performance of impact braking trolleys, including anchor point locations and load arm configurations, are described further in U.S. application Ser. No. 14/664,286, tilted "CABLE-TRAVERSING TROLLEY ADAPTED FOR USE WITH IMPACT BRAKING," and filed Mar. 20, 2015, which is hereby incorporated by reference in its entirety.

In the example, a top 230 of the trolley 114 may include a backup carabiner slot 232 with a retaining hook 234. The slot 232 and the hook 234 provide a location for a backup carabiner (not shown) to be positioned without interfering with the components of the trolley 114 and carabiner 130. For example, a backup safety system for a rider may include a backup webbing being attached to the zip line via the backup carabiner so as to provide a secondary support system for the rider. In some examples, the backup carabiner may be substantially similar to the carabiner 130. The hook 234 is disposed at the rear end of the slot 232 and the slot is positioned above and to the rear of the aperture 214. In the example the hook 234 extends above the side plates 204, 206 and is formed at least partially by the insert 220.

The top 230 of the trolley 114 may also include a top mount accessory connection point in the form of an aperture 236 defined in each side plate 204, 206 for attaching a secondary trolley to the rider trolley 114. For example, in a dual (upper and lower) zip line system, two rider trolleys, one stacked above the other and connected together, may be used to support the rider. The upper and lower trolleys and carabiners may be substantially similar to that illustrated in FIGS. 2A and 2B, and as such, a first carabiner extends between the anchor point on the upper trolley to the accessory connection point on the lower trolley, while a second carabiner extends from the anchor point on the lower trolley to support the rider load. In other examples, the upper and lower trolley may be different from one another. Additionally, each side plate 204, 206 may include a recess 238 defined above the aperture 236 so as to enable receipt of the carabiner therethrough.

At a bottom 240 of the trolley 114, the first side plate 204 may include a backstop extension 242 that is positioned opposite the gate 302 of the carabiner 130. The extension 242 is configured to act as a backstop so that when the trolley 114 is attached to the zip line, the zip line moves past the gate 302 and catches on the extension 242 so as to direct the zip line into the bottom opening 210 and towards the sheaves 200, 202. The extension 242 also restricts the zip line from being trapped between the side plate 204 and the carabiner 130. The second side plate 206 may also include an angled extension 244 that is positioned on the gate 302 side of the carabiner 130. The extension 244 is angled toward the gate 302 of the carabiner 130 so as to restrict the zip line from being trapped between the side plate 206 and the carabiner 130, while still enabling the gate 302 to be opened. In the example, the first side plate extension 242 extends farther below the sheaves 200, 202 than the second side plate extension 244. The side plate extensions 242, 244 also shaped and sized to enable the free rotation of the carabiner 130.

In the example, the carabiner 130 may be rotatably coupled to the anchor point of the rider trolley 114 such that the carabiner 130 is prevented from being removed from the trolley 114. That is, the carabiner 130 is integral with the trolley 114. In other examples, the anchor point may be shaped and sized so as to enable the carabiner 130 to be removably attached to the trolley 114 and the carabiner 130 and the trolley 114 can be separated as required or desired. Additionally, as illustrated in FIGS. 2A and 2B, the gate 302 and the locking mechanism 304 are oriented so as to open and unlock with respect to a top portion of the carabiner 103 and proximate the bottom opening 210 of the trolley 114. In other examples, the gate 302 and/or the locking mechanism 304 may be oriented so as to open and unlock with respect to a bottom portion of the carabiner 103 and flipped compared to what is illustrated in FIGS. 2A and 2B.

Figure 2C:
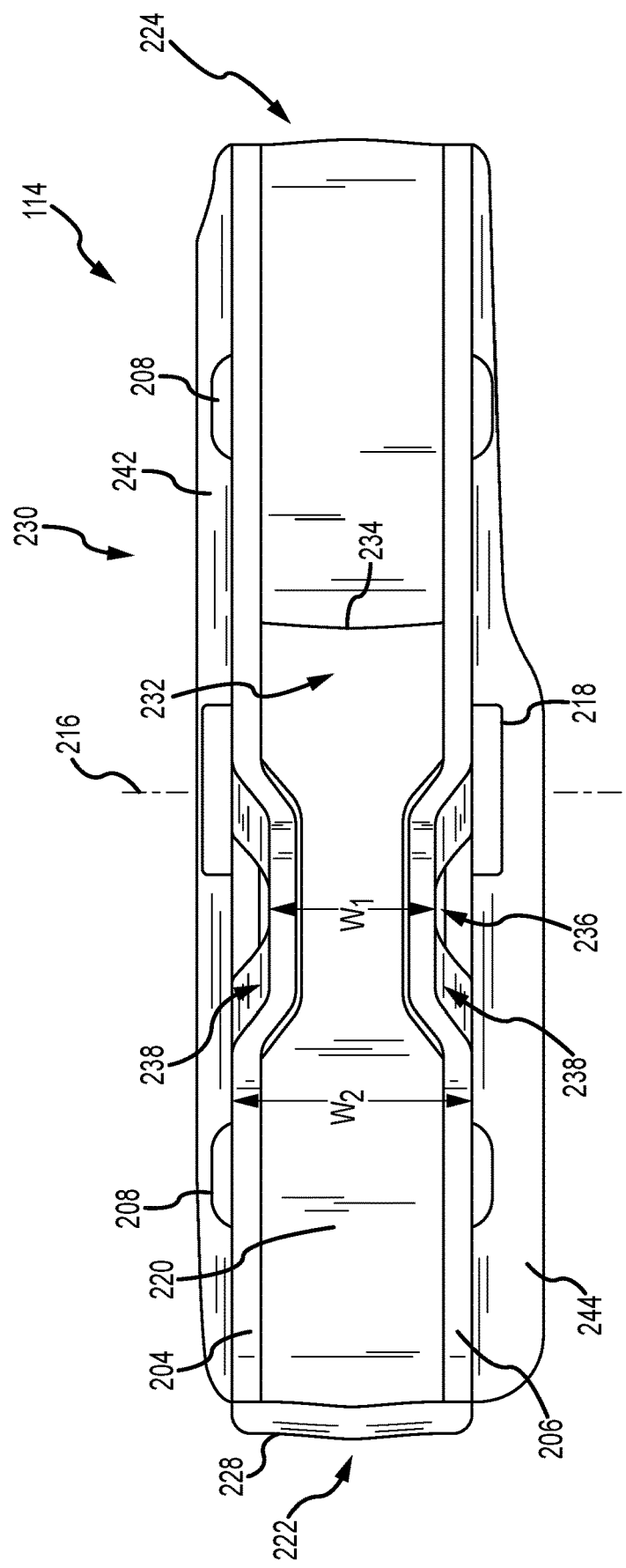
FIG. 2C is a top view of the rider trolley.

FIG. 2C is a top view of the rider trolley 114 with the carabiner not illustrated for clarity. The front 222 of the trolley 114 includes the bumper 228 extending from the insert 220. In the example, the bumper 228 extends over the front portion of each side plate 204, 206 forming the impact surface for impact braking. Other than the bumper 228, the insert 220 is positioned between the side plates 204, 206 and along the top 230 of the trolley 114. The carabiner rotation axis 216 is defined by the anchor point (not shown) that includes the bushing 218 which facilitates carabiner rotation. Between the carabiner rotation axis 216 and the front pivot pin 208 is where the aperture 236 defining the accessory connection point is positioned. The aperture 236 extends through the side plates 204, 206 and the insert 220, and the recesses 238 are positioned on either side of the aperture 236 at the top 230 of the trolley 114. As such, a top width $W_1$ of the accessory connection point is smaller than a width $W_2$ of the trolley 114.

Between the carabiner rotation axis 216 and the rear pivot pin 208 is where the slot 232 and the hook 234 are positioned. The slot 232 extends through the side plates 204, 206 and the insert 220 while the hook 234 is defined primarily in the insert 220. The hook 234 is positioned in a direction towards the front 222 of the trolley 114. In the example, the aperture 236 and the slot 232 are both offset an equal distance from the anchor point. In other examples, these offset distances may be different. Additionally, the backstop extension 242 of the first side plate 204 extends substantially along the entire length of the trolley 114 from the back 224 towards the front 222. The extension 242 not only extends in a downward direction as illustrated in FIGS. 2A and 2B, but also extends in an outward direction as illustrated in FIG. 2C. The angled extension 244 of the second side plate 206 extends substantially from a position proximate the bushing 218 towards the front 222. The extension 244 not only extends in a downward direction as illustrated in FIGS. 2A and 2B, but also extends in an outward direction as illustrated in FIG. 2C. In the example, the extension 244 extends further outward from the trolley 114 than the extension 242.

Figure 2D:
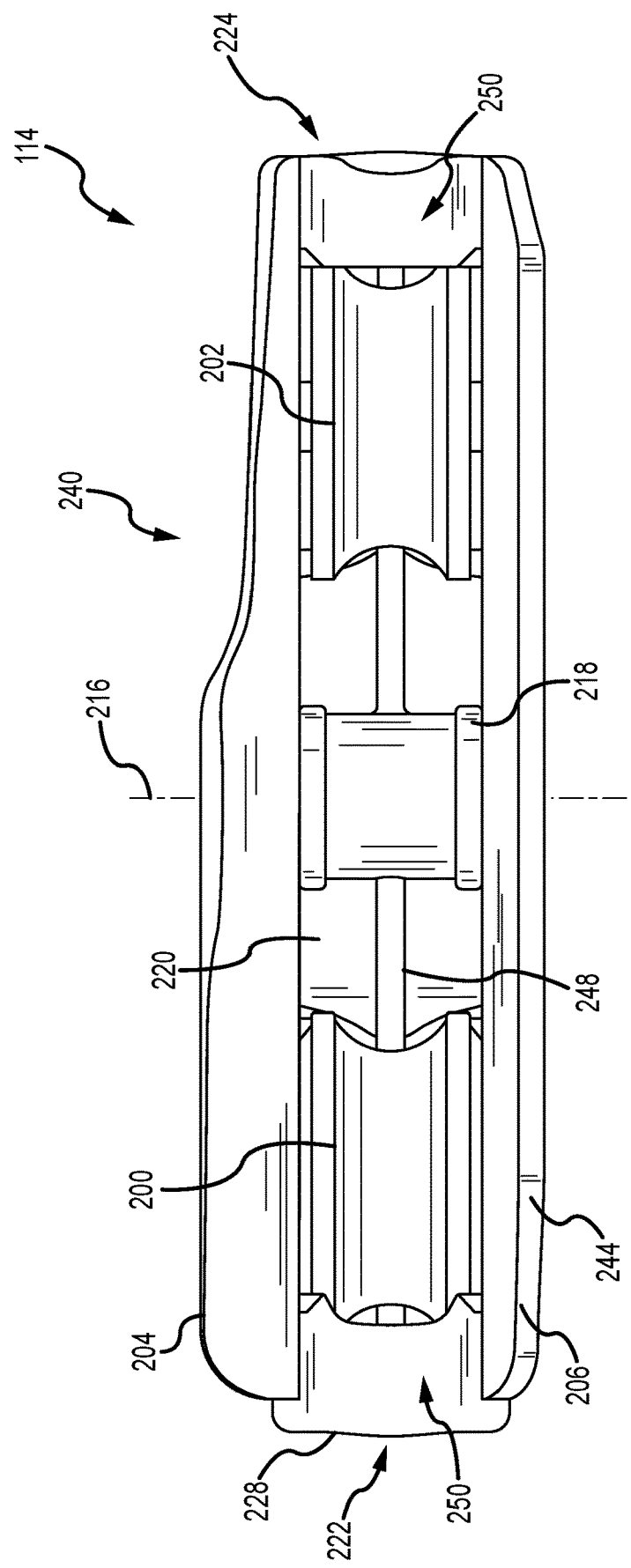
FIG. 2D is a bottom view of the rider trolley.

FIG. 2D is a bottom view of the rider trolley 114 with the carabiner not illustrated for clarity. The bottom 240 of the trolley 114 includes the front sheave 200 and the rear sheave 202 rotatably mounted between two side plates 204, 206. As such, the bottom opening 210 is formed such that the sheaves 200, 202 may be installed on top of a zip line. The sheaves 200, 202 are positioned below the insert 220 that is between the side plates 204, 206. The insert 220 may include one or more support members 248 that structurally support the insert 220. Additionally, at the front 222 and the rear 224 of the trolley 114, the insert 220 includes a curved surface 250 so that the insert 220 is positioned away from the zip line when installed thereon. Additionally, the bushing 218 extends between the side plates 204, 206. In an example, the insert 220 and the busing 218 may be unitarily formed.

Additional views of the rider trolley 114 are illustrated in U.S. application Ser. No. 29/622,586, titled "ZIPLINE TROLLEY," and filed Oct. 18, 2017, which is hereby incorporated by reference in its entirety.

Figure 3A:
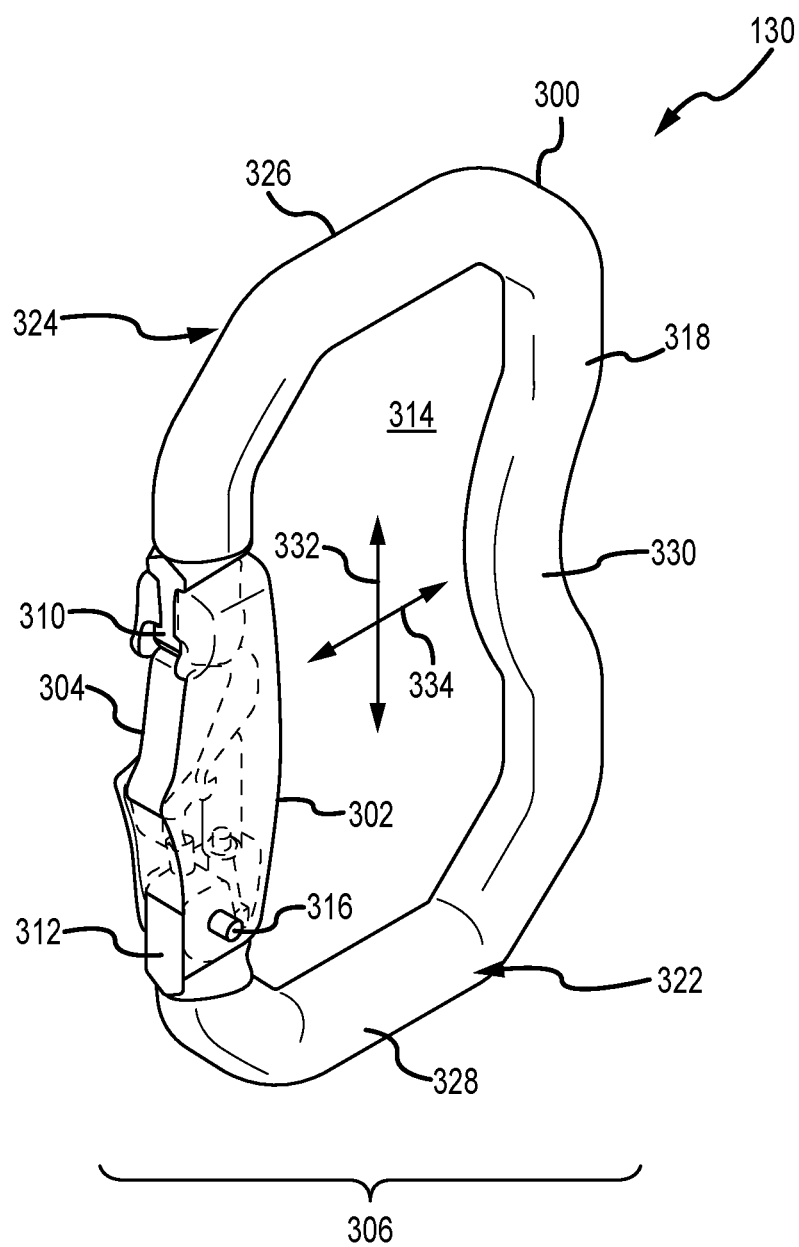
FIG. 3A is a perspective view of the carabiner in a closed and locked condition.
Figure 3B:
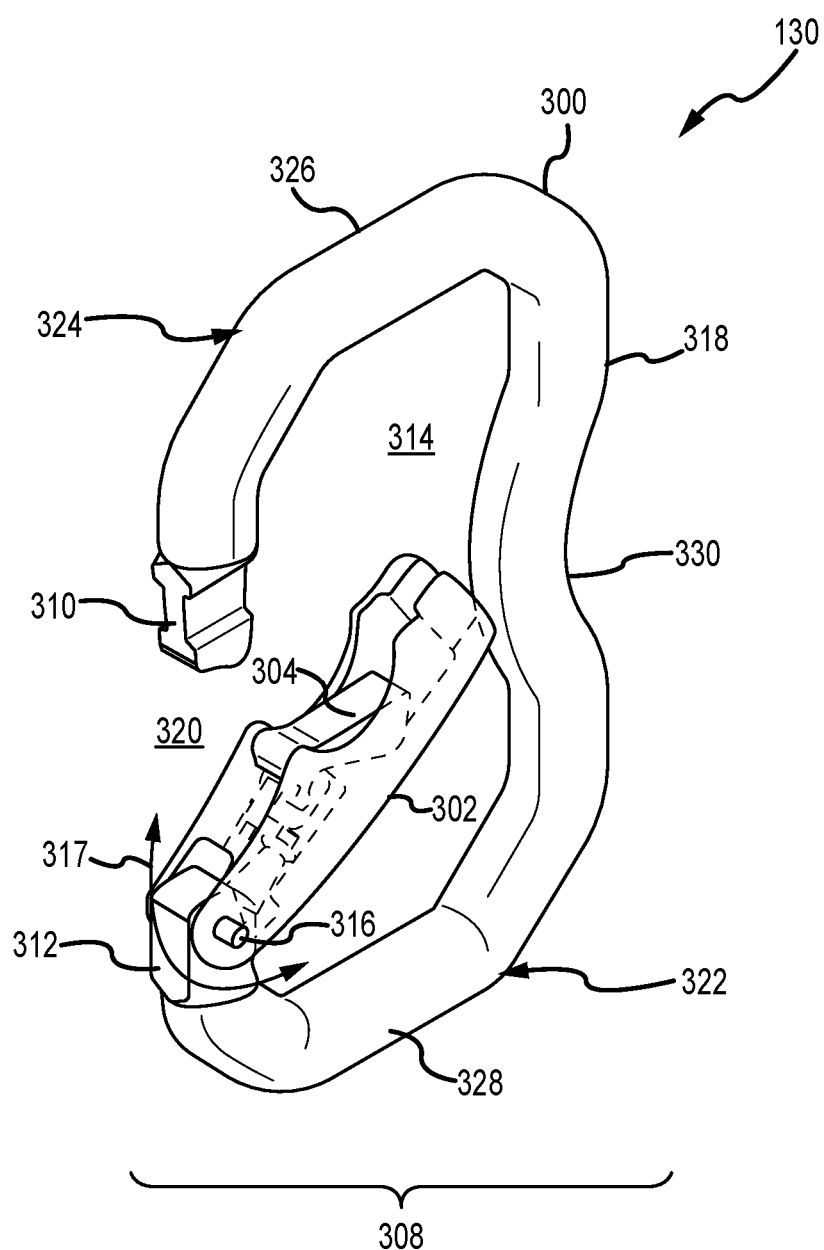
FIG. 3B is a perspective view of the carabiner in an open and unlocked condition.

FIG. 3A is a perspective view of the carabiner 130 in a closed and locked condition 306. FIG. 3B is a perspective view of the carabiner 130 in an open and unlocked condition 308. Referring to both FIGS. 3A and 3B, the carabiner 130 includes a substantially C-shaped body 300 having a first end, also known as a nose 310, and an opposing second end 312. The body 300 defines a chamber 314 that is configured to receive a portion of the trolley, the zip line, and the webbing assembly to secure a rider to the zip line system as described above. The gate 302 extends from the second end 312 to the nose 310 and the gate 302 is rotatably coupled to the second end 312 at a pivot point pin 316. Upon actuation of the locking mechanism 304, the gate 302 may rotate 317 inward from the closed position (shown in FIG. 3A) towards a spine 318 of the body 300 and into the chamber 314 of the body 300 to define the open position (shown in FIG. 3B). In the open position, the gate 302 is positioned away from the nose 310 to form a gate opening 320 that facilitates access to the chamber 314, wherein the wire, webbing, and/or trolley may be received into the body 300.

A locking mechanism 304 is disposed within and rotatably mounted to the gate 302 such that in a locked position (shown in FIG. 3A) the locking mechanism 304 is in a blocking position with respect to the nose 310 to prevent the gate 302 from unintentionally opening without the locking mechanism 304 first being actuated. When the locking mechanism is actuated, the locking mechanism 304 moves to an unlocked position (shown in FIG. 3B) such that the locking mechanism 304 is rotated away from the blocking position so that the gate 302 may be opened. By using a locking mechanism 304 to control the opening and closing of the gate 302, the carabiner 130 may be considered a double locking carabiner which requires two discrete actions to move the carabiner 130 from the closed and locked condition 306 into the open and unlocked condition 308. That is, the locking mechanism 304 must first be actuated and only then may the gate 302 be depressed into the chamber 314 and into the open position. Moreover, the gate 302 and locking mechanism 304 are spring biased such that each will automatically close and automatically lock when released. Actuation of the locking mechanism 304 is discussed further below in reference to FIGS. 4A-4D.

In use, the carabiner 130 facilitates securing the rider to the rider trolley as described above. The closed and locked condition 306 illustrated in FIG. 3A facilitates securing the gate 302 within the carabiner 130 while reducing undesirable gate openings. Additionally, the gate 302 may be opened as illustrated in FIG. 3B, via actuating the locking mechanism 304, such that the body 300 may enable two or more components to be secured together in the zip line system. For example, when the carabiner 130 is unlocked and opened, the nose 310 is free to be received within the webbing assembly so as to secure the carabiner 130 to the rider's harness and the nose 310 is free to be received within the anchor point of the rider trolley so as to secure the carabiner 130 to the trolley. In this example, the webbing assembly may be positioned at a bottom end 322 of the body 300 and the rider trolley is positioned at an opposite top end 324 of the body 300 to facilitate pivotally supporting the rider on the zip line system as described above.

In the example, the top end 324 includes a substantially round section 326 that is received within the anchor point of the rider trolley. The round section 326 slides against the bushing and/or side plates so as to enable smooth and secure free carabiner rotation about the carabiner rotation axis as described above. As such, the bearing surface of the carabiner and trolley connection is the entire anchor point. This increases performance and reduces wear on both the carabiner and trolley when compared to asymmetrical and oval carabiner cross-sections that would bear only on one side during rotation or would not be able to rotate at all. Additionally, the bottom end 322 includes a substantially round section 328 that corresponds to the round section 326 of the top end 324. The round section 328 receives the webbing assembly and further facilitates the rider load to pivot with respect to the trolley and the carabiner.

Furthermore, when the carabiner 130 is unlocked and opened, the zip line may also be received within the chamber 314 of the carabiner 130 through the gate opening 320 to enable the rider trolley and the rider to be positioned on the zip line without removing the carabiner from the trolley. In the example, the locking mechanism 304 is configured to be actuatable and unlocked by the zip line itself. That is, to position the rider trolley on the zip line, the carabiner 130 may be positioned such that the zip line contacts the locking mechanism 304 in order to actuate the locking mechanism 304 and open the gate 302. This enables the rider trolley to be positioned on the zip line with a one-handed operation. In other examples, the carabiner 130 may be used to couple two rider trolleys together in a stacked relationship as described above.

Additionally, in the example, the spine 318 of the carabiner 130 includes a curved section 330 opposite the gate 302 and which curves in a direction towards the gate 302 and into the chamber 314. The curved section 330 is shaped to correspond to a riders thenar muscles (e.g., ball of the thumb) on the hand. The curved section 330 may be utilized to assist in unlocking and opening the carabiner 130. For example, the curved section 330 may be utilized as a surface for the rider and/or zip line operator to press against for actuating the locking mechanism 304 with the zip line via one-hand and opening the gate 302 for receipt of the zip line. In another example, the curved section 330 may be utilized as a supporting surface so that the locking mechanism 304 can be actuated with one hand having one or more fingers reaching around the body 300. In an alternative example, the curved section 330 may extend the entire length of the carabiner from the bottom end 322 towards the top end 324.

As illustrated, the body 300 of the carabiner 130 is substantially C-shaped with the spine 318 including a curved section 330. In alternative examples, the body 300 may have any other shape as required or desired, for example, D-shape, oval-shape, or pear-shape, that enables the carabiner to function as described herein. The top end 324 of the body 300 is formed with a substantially circular cross-section which facilitates engaging the carabiner 130 with the rider trolley as a pivot point. Similarly, the bottom end 322 of the body 300 is formed with a substantially circular cross-section which facilitates engaging the carabiner 130 with the webbing assembly as a pivot point. Other than the top and bottom ends 324, 322 of the body 300, the body 300 has a substantially triangular cross-section with rounded corners. In alternative examples, the body, including the top and bottom ends, may have any other cross-sectional shape that enables the carabiner to function as described herein.

In one example, the shape, size, and material of the carabiner 130 generates a strength of approximately 20 kilonewtons (kN) in a longitudinal direction 332 that extends from the bottom end 322 to the top end 324 and a strength of approximately 7 kN in a transverse direction 334 that extends from the gate 302 to the spine 318 when the carabiner 130 is locked and closed.

FIG. 4A is a partial enlarged side view of the carabiner 130 in the closed and locked condition 306. FIG. 4B is a partial enlarged front view of the carabiner 130 in the closed and locked condition 306. Referring concurrently to FIGS. 4A and 4B, the gate 302 is illustrated as transparent so that the gate components may be shown and described. The gate 302 includes a pivot end 336 that is rotatably coupled to the second end 312 of the body 300 via the pivot pin 316. Opposite the pivot end 336, the gate includes a free end 338 that releasably contacts the nose 310 of the body 300. The pivot end 336 and the free end 338 may define a longitudinal axis of the gate 302.

The gate 302 includes a biasing mechanism 340 disposed at the pivot end 336 and at least partially housed within a first interior channel 342, such that the gate 302 is biased to automatically rotate into the illustrated closed position when it is released. The gate biasing mechanism 340 includes a bias spring 344 disposed within the first interior channel 342 and a pin 346 extending therefrom. The pin 346 is biased, by the bias spring 344, out of the first interior channel 342 and into a gate recess 348 defined in the second end 312 of the body 300 and in a position towards the chamber 314 side of the body 300. To move the gate 302 into an open position, the biasing force of the spring 344 must be overcome such that the pin 346 slides at least partially into the first interior channel 342, thereby enabling rotation of the gate 302 about the pivot pin 316. The amount of force required to overcome the spring 344 and open the gate 302 may be considered an opening force. However, the bias spring 344 consistently urges the pin 346 toward the gate recess 348 such that upon release of the gate 302, the gate 302 automatically rotates back into the illustrated closed position. The gate 302 closing with respect to the nose 310 may be considered a first locking function of the double-locking carabiner 130.

The pivot end 336 of the gate 302 includes two parallel extensions 350 that define a recess therebetween and which receives the second end 312 of the body 300. The pivot pin 316 extends through each extension 350 and the second end 312 so as to rotatably couple the gate 302 to the body 300. In an alternative example, the pivot pin 316 may include a biasing member (e.g., a torsion spring) so as to enable the automatic closing function of the gate as described herein.

In the closed position, the free end 338 of the gate 302 contacts the nose 310. The gate free end 338 includes a channel 352 extending along the longitudinal axis of the gate 302 and defined on the exterior side of the gate 302, opposite the chamber 314. The channel 352 has a first end 354 which corresponds to and facilitates receiving the nose 310. In the example, the nose 310 is substantially I-shaped with two opposing recesses 356. The first end 354 of the channel 352 includes two opposing protrusions 358 corresponding to the nose recesses 356 and which secure the free end 338 of the gate 302 around the nose 310. In other examples, the nose may have any other shape that enables the free end of the gate to be secured.

In some examples, the body 300 may be configured to flex when loaded by a predetermined amount along the longitudinal direction 332 (shown in FIG. 3A). This flex displaces the nose 310 of the body 300 in relation to the second end 312, and as such, induces a mechanical frictional contact between the nose 310 and the free end 338 of the gate 302 (e.g., via contact between the recesses 356 formed in the nose 310 and the protrusions 358 formed in the gate 302). The mechanical frictional contact between the nose 310 and the gate 302 provides an additional safety feature that prevents the gate 302 from opening even if the locking mechanism 304 is unlocked while the carabiner 130 is loaded. That is, the mechanical frictional contact engages the nose 310 and the gate 302 such that the typical opening force will not move the gate 302 into the open position. By positioning the locking mechanism 304 within the gate 302 and below the nose 310, this additional safety feature is enabled to be operable when the gate 302 is closed and the locking mechanism is either locked or unlocked.

In the example, the I-shaped nose 310 extends substantially along the transverse direction 334 (shown in FIG. 3A) such that the flanges of the I-shape are substantially parallel to the transverse direction. In other examples, the I-shaped nose may have one or more flanges that are angled relative to the transverse direction so as to increase the frictional force of the mechanical frictional contact between the nose 310 and the gate 302. In one example, the mechanical frictional contact between the nose 310 and the gate 302 may be induced by a load of 50 pounds or greater on the body 300. In another example, the mechanical frictional contact may be induced by a load of 75 pounds or greater. In still another example, the mechanical frictional contact may be induced by a load of 80 pounds or greater. In yet another example, the mechanical frictional contact may be induced by a load of 100 pounds or greater.

Furthermore, as a larger amount of load is applied in the longitudinal direction, the flex of the body 300 is greater, thereby more rigidly forming the engagement between the nose 310 and the gate 302. As such, under heavy loads the opening force required to overcome the mechanical frictional contact between the nose 310 and the gate 302 is increased, thereby further preventing undesirable or unintentional opening of the gate 302. The curved section 330 of the spine 318 may further enable the flexure of the body 300 as described herein.

The locking mechanism 304 is positioned on the gate 302 and includes a lever arm 360 rotatably coupled to the gate 302 at a pivot point pin 362. In the locked position, the lever arm 360 extends along the longitudinal axis of the gate 302 and is disposed at least partially within the channel 352 defined by the gate 302 so that the lever arm 360 is in a blocking position relative to the nose 310 to prevent opening the gate. The pivot pin 362 is positioned at a second end 364 of the channel 352 and is located on the outside of the gate 302, opposite the chamber 314 formed by the body 300. In the example, the lever arm 360 is configured to rotate 366 in a similar direction and along a similar plane as the rotation of the gate 302 in order to move the lever arm 360 away from the nose 310 and unlock the carabiner 130. That is, the rotational axis of both the gate pivot pin 316 and the lever arm pivot pin 362 are parallel but offset from one another. This enables for one linear unlocking force to rotate both the lever arm 360 and the gate 302 without having to change directions or the type of force applied (e.g., linear to twisting).

The lever arm 360 includes a free end 368 having an end surface 370 that is positioned proximate to a corresponding end surface 372 of the nose 310 to form the blocking position. Until the lever arm 360 is actuated, undesirable opening of the gate 302 is prevented because the end surfaces 370, 372 may contact one another to prevent gate rotation. This blocking configuration prevents the gate 302 from rotating open until the lever arm 360 is actuated, because the free end 368 of the lever arm 360 is blocked by the nose 310 when an opening force is applied to the gate 302. In the example, both end surfaces 370, 372 are curved, however, in alternative examples, both end surfaces may be oblique surfaces. As such, in order to open the gate 302, the locking mechanism 304 requires actuation to facilitate rotation and opening of the gate 302. Additionally, the blocking configuration of the lever arm 360 also reduces undesirable and unintentional gate openings due to vibration of the carabiner 130. For example, during zip line system operation, the carabiner 130 may vibrate due to the trolley travelling down the zip line. The lever arm 360 prevents the gate 302 from opening due to this vibration because it is positioned adjacent to the nose 310 and in the blocked position. Moreover, undesirable and unintentional gate openings from vibration are further prevented from the mechanical frictional contact between the nose 310 and the gate 302 upon loading as described above. This additional safety feature further prevents the gate 302 from opening during zip line system operation, even if the lever arm 360 is vibrated to an unlocked position.

Similar to the gate 302, the lever arm 360 also includes a biasing mechanism 374 disposed proximate the pivot pin 362 and at least partially housed within a second interior channel 376 that is formed at the second end 364 of the channel 352, such that the lever arm 360 is biased to automatically rotate into the illustrated locked position when it is released. The lever arm biasing mechanism 374 includes a bias spring 378 disposed within the second interior channel 376 and a pin 380 extending therefrom. The pin 380 is biased, by the bias spring 378, out of the second interior channel 376 an into a lever arm recess 382 defined in an extension 384 of the lever arm 360 opposite the free end 368. To move the lever arm 360 into an unlocked position, the biasing force of the spring 378 must be overcome such that the pin 380 slides at least partially into the second interior channel 376, thereby enabling rotation of the lever arm 360 about the pivot pin 362. The amount of force required to overcome the spring 378 and unlock the locking mechanism 304 may be considered an unlocking force. However, the bias spring 378 consistently urges the pin 380 toward the lever arm recess 382 such that upon release of the lever arm 360, the lever arm 360 automatically rotates back into the illustrated locked position. The lever arm 360 locking with respect to the nose 310 may be considered a second locking function of the double-locking carabiner 130. In an alternative example, the pivot pin 362 may include a biasing member (e.g., a torsion spring) so as to enable the automatic locking function of the locking mechanism as described herein.

FIG. 4C is a partial enlarged side view of the carabiner 130 in a closed and unlocked condition 386. The closed and unlocked condition 386 is between the closed and locked condition 306 (shown in FIGS. 4A and 4B) and the open and unlocked condition 308 (shown in FIG. 4D). As such, the gate 302 is still closed and extends between the first end 310 and second end of the body, however, the locking mechanism 304 has been actuated and is unlocked so that the gate 302 may be moved into the open position as required or desired. To unlock the locking mechanism 304, the lever arm 360 is actuated by rotating it towards a back wall 388 of the channel 352 such that the free end 368 of the lever arm 360 is positioned away from the nose 310 and at least partially disposed within the channel 352, thereby enabling the gate 302 to rotate. By moving the lever arm 360, the free end 368 is no longer in the blocking position with respect to the nose 310 and the gate 302 can freely rotate to open the carabiner 130.

Additionally, the rotation of the lever arm 360 about the pivot pin 362 depresses the pin 380 within the second interior channel 376 and into the biasing spring 378, via the extension 384, which generates a resistance force in the bias spring 378 such that once the lever arm 360 is released the lever arm 360 will automatically rotate back into the locked position (shown in FIGS. 4A and 4B). In the closed and unlocked condition 386, the gate 302 remains closed until the lever arm 360 is actuated and moved away from the nose 310. Once the lever arm 360 is actuated, the gate 302 still is maintained in the closed position until it is actively rotated into the opened position.

In the example, the gate 302 includes a concave portion 390 defined on an outside wall 392 of the gate 302. The lever arm 360, in the locked position (shown in FIGS. 4A and 4B), extends across the concave portion 390 and along the outside wall 392 such that the lever arm 360 is partially disposed outside of the gate 302. In the example, the concave portion 390 is sized and shaped to correspond to the shape and size of the zip line wire such that the lever arm 360 may be actuated from the locked position to the unlocked position (shown in FIG. 4C) through contact force applied through the zip line wire. For example, the rider and/or zip line operator may press against the curved section of the carabiner 130 while the lever arm 360 is adjacent the zip line wire so as to actuate the locking mechanism 304 with a one-handed operation.

Once the locking mechanism 304 is unlocked, the zip line wire may be disposed within the concave portion 390 so as to further be utilized to move the gate 302 towards the open position (shown in FIG. 4D). For example, the rider and/or zip line operator may continue to press against the curved section of the carabiner 130 while the zip line wire is disposed at least partially within the concave portion 390 so as to open the gate 302 with a one-handed operation. As described above, once the gate 302 is opened, the zip line wire may be received within the carabiner 130. This opening of the gate 302 by the zip line wire further facilitates one-handed use of the carabiner 130. Additionally, the lever arm 360 may also be actuated from the locked position to the unlocked position through pressure applied by a finger or a thumb. In alternative examples, the locking mechanism 304 and/or concave portion 390 may be sized and/or shaped to correspond to any other object, such as a rope, to actuate the unlocking of the locking mechanism 304. Generally, unlocking the locking mechanism 304 is performed by a contact force that is applied from the exterior side of the gate 302, and as such, during operation, the zip line wire cannot unlock the locking mechanism.

FIG. 4D is a partial enlarged side view of the carabiner 130 in the open and unlocked condition 308. In the open and unlocked condition 308, the lever arm 360 is rotated towards the back wall 388 of the gate channel 352 such that the lever arm 360 is positioned away from the nose 310 and unlocked as described above in FIG. 4C. Once the locking mechanism 304 is unlocked, the gate 302 may be rotated towards the spine of the body 300 and into the illustrated open position. In the open position, the gate free end 338 is rotated away from the nose 310 of the body 300 to form the gate opening 320 and enable the wire, or webbing, and/or trolley to be received into the body 300 and the chamber 314. Additionally, the rotation of the gate 302 about the pivot pin 316 depresses the pin 346 within the first interior channel 342 and into the biasing spring 344 that generates a resistance force in the bias spring 344 such that once the gate 302 is released, the gate 302 will automatically rotate back into the closed position (shown in FIGS. 4A and 4B).

To close the carabiner 130 from the open and unlocked condition 308, the gate 302 and lever arm 360 may be released, because the gate 302 and the locking mechanism 304 are automatically biased to return to the closed and locked condition 306 (shown in FIGS. 4A and 4B). Once the locking mechanism 304 is released, the lever arm 360, via the biasing spring 378, returns to the locked position and extends across the concave portion 390 along the outside wall 392 of the gate 302. Once the gate 302 is released, the gate 302, via the biasing spring 344, returns to the closed position and extends from the second end 312 of the body 300 to the nose 310. As the gate 302 automatically rotates back into the closed position, the lever arm 360 of the locking mechanism 304 contacts the nose 310 briefly causing the lever arm 360 to rotate until the end surface 370 of the lever arm 360 can slide along the end surface 372 of the nose 310 and into the locked position. For example, an outside end 394 of the lever arm 360 is configured to contact an inside end 396 of the nose 310 as the gate 302 is rotating to the closed position to temporarily hold the lever arm 360 in position until the lever arm 360 may slide along the nose 310 and lock the locking mechanism 304 in the blocking position.

Additional views of the carabiner 130 are illustrated in U.S. application Ser. No. 29/622,582, tilted "CARABINER," and filed Oct. 18, 2017, which is hereby incorporated by reference in its entirety.

FIGS. 5A-H are a plurality of free body diagrams illustrating alternative examples of a locking mechanism 500 configuration for use with the carabiner as described above. Each free body diagram depicts a lever arm 502 that is rotatably mounted at a pivot pin 504 and at least partially within the gate of the carabiner as described above. A first arrow (1) illustrates the direction of the force required for actuating the locking mechanism 500 and rotating the lever arm 502 from a locked to an unlocked position. For example, the force direction may be the direction of the zip line wire that pushes against the lever arm 502 or the direction that the riders and/or zip line operator hand pressing against the lever arm 502. A second arrow (2) illustrates the resultant movement of the lever arm 502 induced by the force direction arrow (1). For example, the resultant movement may be rotational movement about the pivot pin 504 (as shown in FIGS. 19A-G) or may be linear movement (as shown in FIG. 19H). A third arrow (3) illustrates how the nose of the carabiner body will contact the lever arm 502 while closing the carabiner in order to facilitate the automatic lock functionality of the locking mechanism 500.

More specifically, FIGS. 5A-C illustrate a back locking mechanism configuration with respect to the carabiner nose. That is, each respective lever arm geometry rotates in an inward direction with respect to the carabiner body such that an inward or back end of the carabiner nose contacts the lever arm to facilitate automatically locking the locking mechanism. These configurations are most similar to the locking mechanism operation described above in reference to FIGS. 4A-4D. FIG. 5D illustrates a front locking mechanism configuration with respect to the carabiner nose. This is, in this example, the lever arm rotates in an outward direction with respect to the carabiner body such that an outward or front end of the carabiner nose contact the lever arm to facilitate automatically locking the locking mechanism. FIGS. 5E-H illustrate a bottom locking mechanism configuration with respect to the carabiner nose. That is, in these examples, the carabiner nose is positioned below the second end of the carabiner so that each respective lever arm geometry rotates either in an inward direction (FIG. 5E), in an outward direction (FIGS. 5F and 5G), or linearly slides (FIG. 5H) with respect to the carabiner body such that the carabiner nose that is lower than the gate pivot location contacts the lever arm to facilitate automatically locking the locking mechanism.

Notwithstanding the appended claims, the disclosure is also defined by the following clauses:

1. A locking carabiner comprising:
    a body comprising a first end and a second end;
    a gate rotatably coupled to the second end about a gate axis; and
    a locking mechanism rotatably coupled to the gate about a locking mechanism axis, wherein the locking member is configured to engage with the first end, wherein the gate axis is substantially parallel to, and offset from, the locking mechanism axis, and wherein the rotation of the locking mechanism is in a substantially similar plane as the rotation of the gate.

2. The locking carabiner of clause 1 any clause which depends from clause 1, wherein the locking carabiner is movable between a first condition in which the gate is closed and the locking mechanism is locked, a second condition in which the gate is closed and the locking mechanism is unlocked, and a third condition in which the gate is open and the locking mechanism is unlocked, wherein when the gate is closed, the gate is in contact with the first end, and when the gate is open, the gate is positioned away from the first end, and wherein when the locking mechanism is locked, the locking mechanism prevents the gate from opening, and when the locking mechanism is unlocked, the locking mechanism enables the gate to open.

3. The locking carabiner of clause 2 or any clause which depends from clause 2, wherein the gate and the locking member are biased so as to rotate automatically towards the first condition.

4. The locking carabiner of clause 2 or any clause which depends from clause 2, wherein the gate defines a longitudinal axis, and wherein the locking mechanism comprises a lever arm rotatably coupled to the gate and extending substantially along the longitudinal axis, the lever arm comprising a free end configured to be positioned proximate the first end and in a blocking position so as to prevent the gate from opening.

5. The locking carabiner of clause 4, wherein the locking mechanism further comprises a bias spring disposed opposite the free end and configured to bias the lever arm toward the first condition.

6. The locking carabiner of clause 2 or any clause which depends from clause 2, wherein the gate further comprises a bias spring disposed proximate the second end and configured to bias the gate toward the first condition.

7. The locking carabiner of clause 2 or any clause which depends from clause 2, wherein the gate rotates in a substantially similar direction as the locking mechanism when moving between the first condition, the second condition, and the third condition.

8. The locking carabiner of clause 1 or any clause which depends from clause 1, wherein the gate comprises a concave portion, and wherein the locking mechanism is disposed at least partially within the concave portion.

9. The locking carabiner of clause 8, wherein the concave portion is sized and shaped to receive a zip line wire.

10. The locking carabiner of clause 9, wherein a force applied to the locking mechanism rotates the locking mechanism about the locking mechanism axis.

11. The locking carabiner of clause 1 or any clause which depends from clause 1, wherein the body is substantially C-shaped.

12. The locking carabiner of clause 11 or any clause which depends from clause 11, wherein the body includes a spine opposite the gate, and wherein the spine comprises a curved section.

13. The locking carabiner of clause 11 or any clause which depends from clause 11, wherein at least a portion of a top end of the body comprises a substantially circular cross-section.

14. The locking carabiner of clause 13, wherein at least a portion of a bottom end of the body comprises a substantially circular cross-section.

15. The locking carabiner of clause 1 or any clause which depends from clause 1, further comprising a trolley rotatably coupled to the body.

16. The locking carabiner of clause 15, wherein the trolley comprises:
   two side plates;
   a first sheave rotatably mounted between the two side plates;
   a second sheave rotatably mounted between the two side plates; and
   an anchor point defined within the two side plates for receiving the locking carabiner, wherein the anchor point is positioned at a midpoint between the first sheave and the second sheave and above a zip line when the trolley is installed on the zip line.

17. The locking carabiner of clause 16 or any clause which depends from clause 16, wherein the trolley further comprises a bushing positioned within the anchor point, and wherein the bushing is substantially circular for receiving a corresponding top end of the body of the locking carabiner.

18. The locking carabiner of clause 16 or any clause which depends from clause 16, wherein a top end of the trolley comprises:
   a slot and a hook defined by the top end; and
   an accessory connection point positioned adjacent to the slot and defined within the two side plates.

19. The locking carabiner of clause 18, wherein the slot and the accessory connection point are both offset from the midpoint.

20. A locking carabiner comprising:
   a substantially C-shaped body comprising a first end and a second end;
   a gate rotatably coupled to the second end, wherein the gate is rotatable between a closed position where the gate contacts the first end and an open position where the gate is positioned away from the first end, and wherein the gate is biased to rotate automatically towards the closed position;
   a locking mechanism rotatably coupled to the gate, wherein the locking mechanism is rotatable between a locked position where the locking mechanism is in a blocking position with respect to the first end to prevent the gate from opening and an unlocked position where the locking mechanism is out of the blocking position with respect to the first end to enable the gate to open, wherein the locking mechanism is biased to rotate automatically towards the locked position, and wherein a direction the gate rotates between the open position and the closed position is substantially similar to a direction the locking mechanism rotates between the locked position and the unlocked position.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. For example, the carabiner described herein may be configured for use in other safety-critical system in addition to zip lines, such as rock and mountain climbing, arboriculture, caving, ailing, hot air ballooning, rope rescue, construction, industrial rope work, window cleaning, whitewater rescue, acrobatics, etc. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A locking carabiner comprising:
   a body comprising a first end and a second end;
   a gate rotatably coupled to the second end about a gate axis; and
   a locking mechanism rotatably coupled to the gate about a locking mechanism axis, wherein the locking mechanism is configured to engage with the first end, wherein the gate axis is substantially parallel to, and offset from, the locking mechanism axis, and wherein the rotation of the locking mechanism is in a substantially similar plane as the rotation of the gate,
   wherein the locking carabiner is movable between a first condition in which the gate is closed and the locking mechanism is locked, a second condition in which the gate is closed and the locking mechanism is unlocked, and a third condition in which the gate is open and the locking mechanism is unlocked, wherein when the gate is closed, the gate is in contact with the first end, and when the gate is open, the gate is positioned away from the first end, and wherein when the locking mechanism is locked, the locking mechanism prevents the gate from opening, and when the locking mechanism is unlocked, the locking mechanism enables the gate to open, and
   wherein the gate rotates in a substantially similar direction as the locking mechanism when moving between the first condition, the second condition, and the third condition.

2. The locking carabiner of claim 1, wherein the gate and the locking mechanism are biased so as to rotate automatically towards the first condition.

3. The locking carabiner of claim 1, wherein the gate defines a longitudinal axis, and wherein the locking mechanism comprises a lever arm rotatably coupled to the gate and extending substantially along the longitudinal axis, the lever arm comprising a free end configured to be positioned proximate the first end and in a blocking position so as to prevent the gate from opening.

4. The locking carabiner of claim 3, wherein the locking mechanism further comprises a bias spring disposed opposite the free end and configured to bias the lever arm toward the first condition.

5. The locking carabiner of claim 1, wherein the gate further comprises a bias spring disposed proximate the second end and configured to bias the gate toward the first condition.

6. The locking carabiner of claim 1, wherein the gate comprises a concave portion, and wherein the locking mechanism is disposed at least partially within the concave portion.

7. The locking carabiner of claim 6, wherein the concave portion is sized and shaped to receive a zip line wire.

8. The locking carabiner of claim 7, wherein a force applied to the locking mechanism rotates the locking mechanism about the locking mechanism axis.

9. The locking carabiner of claim 1, wherein the body is substantially C-shaped.

10. The locking carabiner of claim 9, wherein the body includes a spine opposite the gate, and wherein the spine comprises a curved section.

11. The locking carabiner of claim 9, wherein at least a portion of a top end of the body comprises a substantially circular cross-section.

12. The locking carabiner of claim 11, wherein at least a portion of a bottom end of the body comprises a substantially circular cross-section.

13. A locking carabiner comprising:
a body comprising a first end and a second end;
a gate rotatably coupled to the second end about a gate axis;
a locking mechanism rotatably coupled to the gate about a locking mechanism axis, wherein the locking mechanism is configured to engage with the first end, wherein the gate axis is substantially parallel to, and offset from, the locking mechanism axis, and wherein the rotation of the locking mechanism is in a substantially similar plane as the rotation of the gate; and
a trolley rotatably coupled to the body.

14. The locking carabiner of claim 13, wherein the trolley comprises:
two side plates;
a first sheave rotatably mounted between the two side plates;
a second sheave rotatably mounted between the two side plates; and
an anchor point defined within the two side plates for receiving the locking carabiner, wherein the anchor point is positioned at a midpoint between the first sheave and the second sheave and above a zip line when the trolley is installed on the zip line.

15. The locking carabiner of claim 14, wherein the trolley further comprises a bushing positioned within the anchor point, and wherein the bushing is substantially circular for receiving a corresponding top end of the body of the locking carabiner.

16. The locking carabiner of claim 14, wherein a top end of the trolley comprises:
a slot and a hook defined by the top end; and
an accessory connection point positioned adjacent to the slot and defined within the two side plates.

17. The locking carabiner of claim 16, wherein the slot and the accessory connection point are both offset from the midpoint.

18. A locking carabiner comprising:
a substantially C-shaped body comprising a first end and a second end and defining a chamber therein;
a gate rotatably coupled to the second end, wherein the gate is rotatable between a closed position where the gate contacts the first end and an open position where the gate is positioned away from the first end, and wherein the gate is biased to rotate automatically towards the closed position; and
a locking mechanism rotatably coupled to the gate and disposed on an exterior side of the gate relative to the chamber, wherein the locking mechanism is rotatable between a locked position where the locking mechanism is in a blocking position with respect to the first end to prevent the gate from opening and an unlocked position where the locking mechanism is out of the blocking position with respect to the first end to enable the gate to open, wherein the locking mechanism is biased to rotate automatically towards the locked position, and wherein a direction the gate rotates between the open position and the closed position is substantially similar to a direction the locking mechanism rotates between the locked position and the unlocked position.

* * * * *